J. DEMMLER.
DIFFERENTIAL GEARING FOR AUTOMOBILES.
APPLICATION FILED AUG. 22, 1910.
997,606.
Patented July 11, 1911.
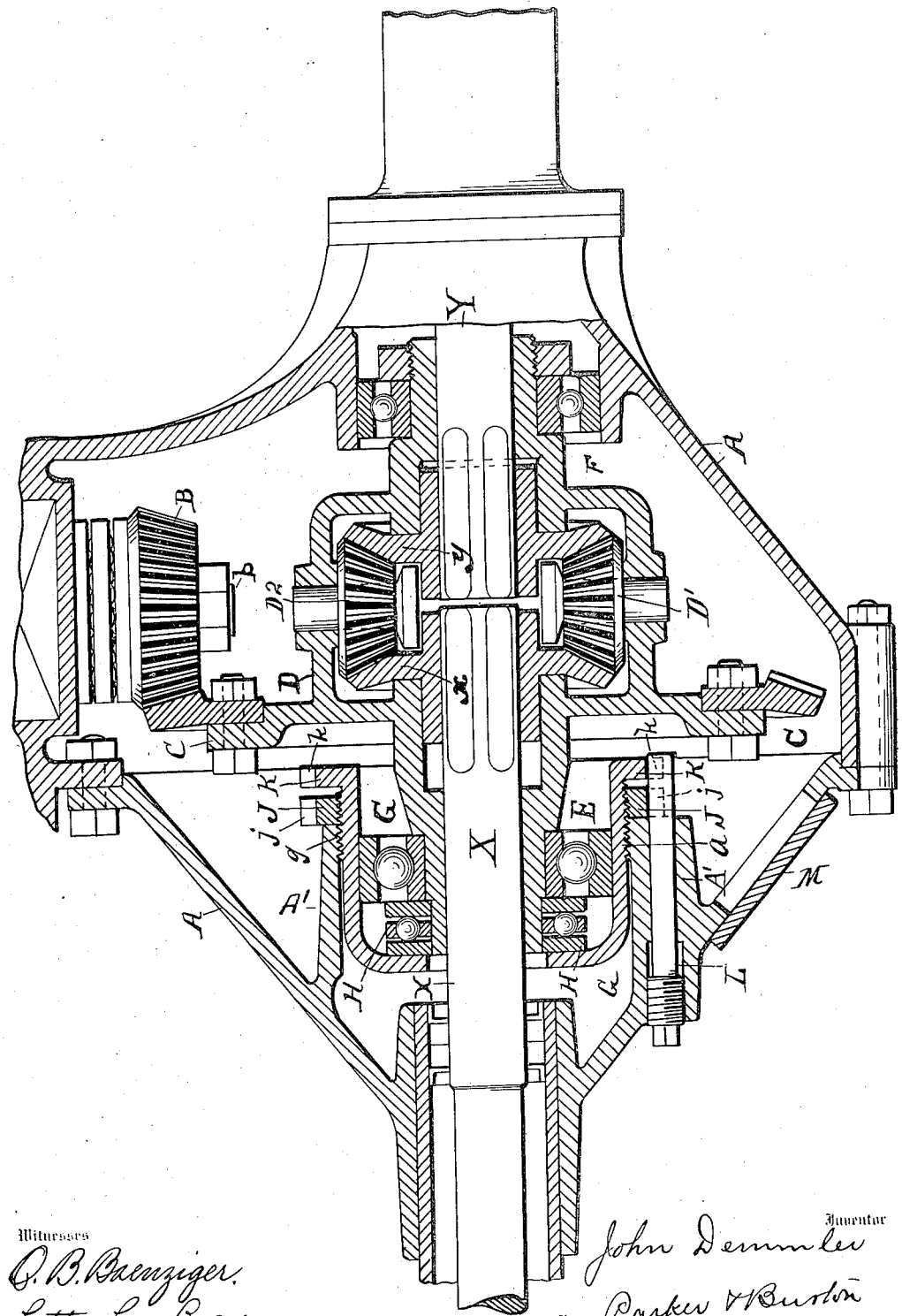

UNITED STATES PATENT OFFICE.

JOHN DEMMLER, OF LANSING, MICHIGAN.

DIFFERENTIAL GEARING FOR AUTOMOBILES.

997,606.

Specification of Letters Patent.

Patented July 11, 1911.

Application filed August 22, 1910. Serial No. 578,275.

*To all whom it may concern:*

Be it known that I, JOHN DEMMLER, a subject of the Emperor of Germany, residing at Lansing, county of Ingham, State of Michigan, have invented a certain new and useful Improvement in Differential Gearing for Automobiles, and declare the following to be a full, clear, and exact description of the same, such as will enable others skilled in the art to which it pertains to make and use the same, reference being had to the accompanying drawings, which form a part of this specification.

My invention relates to differential gearing for automobiles, and consists in the improvements hereinafter described and pointed out in the claims.

Referring to the accompanying drawing:—The figure is a view mainly in section of an apparatus embodying my invention.

X and Y are the two parts of the driving shaft of an automobile.

$x$, indicates the usual bevel gear wheel upon the part X, and $y$, represents the usual bevel gear wheels upon the part Y.

D, is the differential gear casing in which are the radially extending stub shafts upon which are pivoted the gear wheels $D^1$, $D^2$, which engage the teeth of the gear wheels $x$ and $y$. The differential casing D is capable of a small adjustment longitudinally of the shafts X and Y to secure the proper relative positions of the bevel gear wheels B and C to secure noiseless operation thereof.

A, is the housing which incloses the shafts X, Y, and the driving mechanism.

B, is a conical gear wheel upon the end of the driving shaft $b$.

C, is a gear wheel upon the differential gear casing D, which gear wheel, the wheel B engages to rotate said differential casing.

E and F are ball bearings in which the differential casing D rests and is adapted to turn. Said casing has cylindrical portions extending in each direction resting in said bearings. The housing A is provided with a cylindrical inwardly extending portion $A^1$ coaxial with the shaft X.

$a$, indicates internal screw threads at the inner end of the cylinder $A^1$.

G, is a cup provided with screw threads $g$ adapted to engage the threads $a$, the inner end of the cup G is open and the outer end is partially closed, the ball bearing E rests in the cup G.

H, indicates a thrust bearing resting against the partially closed outer end of the cup G and against a shoulder or collar on the differential casing D. The thrust bearing H is adapted to receive the thrust due to the action of the gear wheel B upon the gear wheel C. The inner end of the cup G is turned outward to form a flange K and this flange is provided with a series of equally spaced notches or indentations $k$.

J, is a jam nut, its threads engaging with the threads $g$. In the periphery of the nut J are formed a series of equally spaced slots or indentations $j$; the slots $k$ and $j$ are adapted to receive the engaging portion of a wrench by which the nut J or the cup G may be turned.

M, is an opening in the housing A through which a wrench may be inserted to adjust the nut J and the cup G.

L, is a bolt extending through an aperture formed to receive it in the housing A and adapted to extend through a notch $j$ and into a notch $k$ so that the nut J and cup G shall be bound together and rotation of the cup G prevented. The bolt L is provided with screw threads $c$ toward its outer end engaging screw threads formed to receive it in the outer end of the opening in the housing A and the bolt L is provided with a head adapted to be engaged by a socket wrench. By this construction the position of the cup G may be accurately adjusted and the cup secured immovable in its adjusted position so that the relative positions of the bevel gear wheels B and C may be properly adjusted.

What I claim is:—

1. The combination of a driving shaft, a beveled gear wheel on said driving shaft, a differential gear casing, a beveled gear wheel on said casing engaging the beveled gear wheel on said driving shaft, a stationary cylinder coaxial with said gear casing and provided with screw threads, a cup provided with screw threads engaging the screw threads on said cylinder, a bearing for said casing in said cup, and a thrust bearing engaging said cup and casing.

2. The combination of a housing, a differential gear case in said housing, a beveled gear wheel on said casing, a driving shaft, a beveled gear wheel thereon engaging the beveled gear wheel on said casing, said housing being provided with a cylindrical surface coaxial with said casing and having screw threads, a cup provided with screw threads engaging the screw threads in said housing, a bearing for said casing within said cup, and a thrust bearing engaging between said cup and casing, said housing being provided with an aperture through which access may be had to said cup for the purpose of adjusting the same.

3. The combination of a housing, a shaft in said housing, said housing being provided with a cylindrical surface concentric with said shaft and having screw threads, a cup provided with screw threads engaging the screw threads on said housing, a bearing for said shaft within said cup, and a thrust bearing engaging between said cup and shaft, substantially as and for the purpose described.

4. The combination of a housing, a shaft in said housing, said housing being provided with a cylindrical surface concentric with said shaft and having internal screw threads, a cup provided with external screw threads engaging the screw threads on said housing, the edge of said cup being turned outward to form an annular flange, a bearing for said shaft within said cup, said cup being provided with indentations $k$, in its outwardly extending edge and a bolt L engaging through said housing and engaging in said notches.

5. The combination of a housing, a shaft in said housing, said housing being provided with a cylindrical surface concentric with said shaft and having screw threads, a cup provided with screw threads engaging the screw threads on said housing, a bearing for said shaft within said cup, a jam nut on said cup and engaging said housing, said jam nut being provided with peripheral notches $j$ and a bolt L engaging through said housing and engaging within one of said notches, substantially as and for the purpose described.

6. The combination of a housing, a shaft in said housing, said housing being provided with a cylindrical surface concentric with said shaft and having internal screw threads, a cup provided with external screw threads engaging the screw threads on said housing, the edge of said cup being turned outward to form an annular flange, a bearing for said shaft within said cup, said cup being provided with notches $k$ in its outwardly extending edge, a jam nut on said cup provided with peripheral notches $j$, a bolt L engaging through said housing and engaging in a notch on said jam nut and in a notch on said cup.

7. The combination of a housing, a shaft in said housing, said housing being provided with a cylindrical surface concentric with said shaft and having internal screw threads, a cup provided with external screw threads engaging the screw threads on said housing, the edge of said cup being turned outward to form an annular flange, a bearing for said shaft within said cup, said cup being provided with notches $k$ in its outwardly extending edge, a jam nut on said cup provided with peripheral notches $j$, a bolt L engaging through said housing and engaging in a notch on said jam nut and in a notch on said cup, said housing being provided with an aperture through which access may be had to said cup and not for the purpose of adjusting the bearing.

In testimony whereof, I sign this specification in the presence of two witnesses.

JOHN DEMMLER.

Witnesses:
B. H. WARNER,
HARRIS E. THOMAS.